United States Patent [19]
Avital

[11] 3,710,311
[45] Jan. 9, 1973

[54] HELICOPTER LIGHTING SYSTEM AND LIGHT UNITS USEFUL THEREIN

[76] Inventor: Ron Avital, 134 Katzenelson Street, Givatavim, Israel

[22] Filed: Nov. 23, 1970

[21] Appl. No.: 92,055

[30] Foreign Application Priority Data

Nov. 28, 1969 Israel ..................................... 33446

[52] U.S. Cl. .................. 340/27, 340/366 F, 240/1.2, 240/7.7
[51] Int. Cl. .............................................. G08g 5/00
[58] Field of Search ........ 340/27, 25, 366 F; 240/1.2, 240/7.7, 103 R

[56] References Cited

UNITED STATES PATENTS

| | | | |
|---|---|---|---|
| 2,555,807 | 6/1951 | Morris | 240/7.7 |
| 3,174,552 | 3/1965 | Soucy, Jr. | 240/7.7 |
| 2,259,028 | 10/1941 | Eliot | 240/103 R |
| 3,395,875 | 8/1968 | Donovan | 240/7.7 |
| 2,423,528 | 7/1947 | Stewart | 340/25 |
| 3,455,272 | 7/1969 | Zeller | 240/7.7 |

FOREIGN PATENTS OR APPLICATIONS

| | | | |
|---|---|---|---|
| 1,197,261 | 7/1970 | Great Britain | 240/7.7 |

*Primary Examiner*—John W. Caldwell
*Assistant Examiner*—Robert J. Mooney
*Attorney*—Benjamin J. Barish

[57] ABSTRACT

The invention relates to helicopter lighting systems particularly for night formation flying. The system includes a first light unit attached to the main helicopter rotor in the vicinity of its tip and a second light unit attached to the main helicopter rotor at a location thereon spaced inwardly from the tip. Upon rotation of the helicopter rotor, the light units provide a light pattern providing a quickly discernible indication to an observer of the attitude of the helicopter and of any change in heading thereof relative to the observer.

8 Claims, 8 Drawing Figures

PATENTED JAN 9 1973

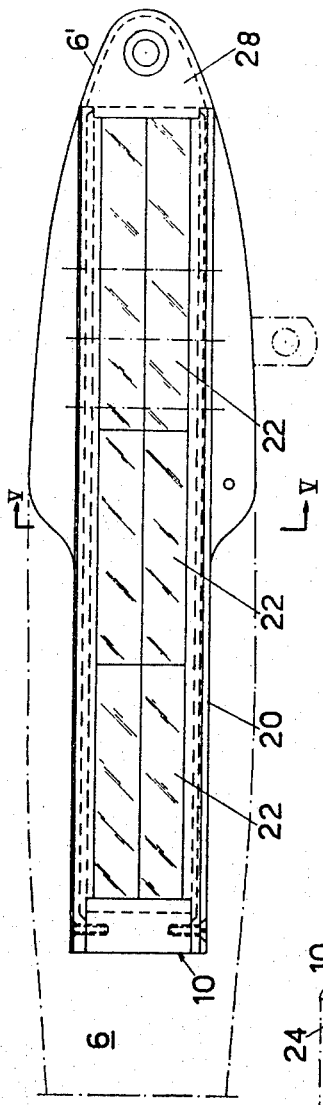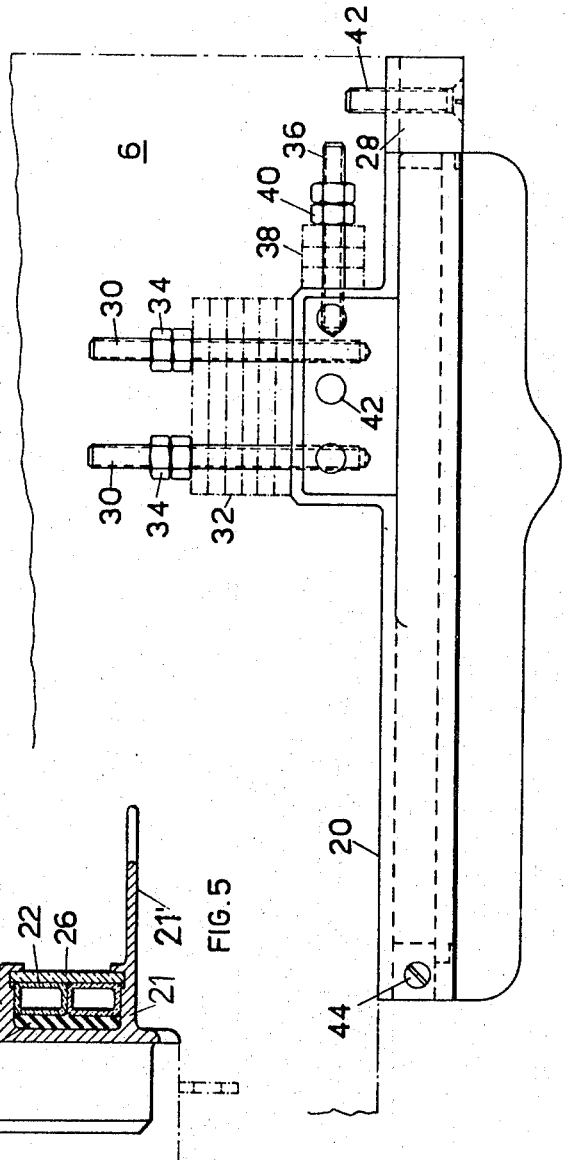

HELICOPTER LIGHTING SYSTEM AND LIGHT UNITS USEFUL THEREIN

BACKGROUND OF THE INVENTION

The present invention relates to helicopter lighting systems, particularly for night formation flying, and to light units useful in such systems.

The currently used systems for lighting helicopters for night formation flying usually include electrically energized light bulbs disposed at the rotor blade tips. I have found such systems to be far from satisfactory for close night formation flying for a number of reasons, namely: They do not provide a clear and quickly-discernible indication to the observer whether the observed helicopter (hereinafter called the leader) is above, below, or at the same attitude with respect to the observer. Also, they do not provide a clear and quickly-discernible prior warning of changes of heading of the leader. Further, because of the high rotational speed of the rotor and the high "G" forces imparted to their tips, such systems impose serious problems with respect to rotor balance, electrical connections to the lighting devices, and maintenance of the lighting devices to provide long life and reliable service.

SUMMARY OF THE PRESENT INVENTION

An object of the present invention is to provide a helicopter lighting system, and also to provide lighting devices useful in such system, which system and devices have advantages particularly in the above respects over the systems and lighting devices currently used.

According to one aspect of the present invention, there is provided a helicopter lighting system characterized in that it includes a first light unit attached to the main helicopter rotor in the velocity of its tip and a second light unit attached to the main helicopter rotor at a location thereon spaced inwardly from the tip, whereby upon rotation of the helicopter rotor said light units produces a light pattern providing a quickly discernible indication to an observer of the attitude of the helicopter and of any change in heading thereof relative to the observer.

More particularly, and as will be described more fully below, the first light unit (tip light) is viewable to an observer in another helicopter in the formation for only a part of each revolution of the rotor, and the second light unit (inboard light) is viewable to such observer for the complete revolution of the rotor. The rotation of the helicopter rotor thus produces a light pattern to such observer, when laterally above or below the helicopter observed, comprising an arc light-streak by the tip light unit, and an elliptical light-streak by the inboard light unit, the two light-streaks together enabling the observer to see quickly the relative attitude and change in heading of the observed aircraft.

The light devices for both of the above light units are preferably self-powered nuclear light devices. One such device which has been successfully used in the "-Betalight"(Trademark) which is sealed glass tube or bulb coated internally with a phosphor and filled with tritium (an isotope of hydrogen gas.) Low energy beta particles from the tritium strike the phosphor which in turn emits light of a color depending upon the type of phosphor used. No batteries or power supplies are required, nor do they need to be exposed to daylight in order to be effective. Such light devices are light in weight, may be safely handled, have a useful life in the order of 20 years, and are available in many different sizes and configurations.

BRIEF DESCRIPTION OF THE DRAWINGS

The invention is herein described, by way of example only, with reference to the accompanying drawings, wherein:

FIG. 3 is a side elevational view of the blade tip light unit used in the system of FIG. 1, FIG. 4 being a top plan view thereof, and FIG. 5 being a transvers sectional view thereof through lines V—V;

DESCRIPTION OF THE PREFERRED EMBODIMENTS

Figure 1:
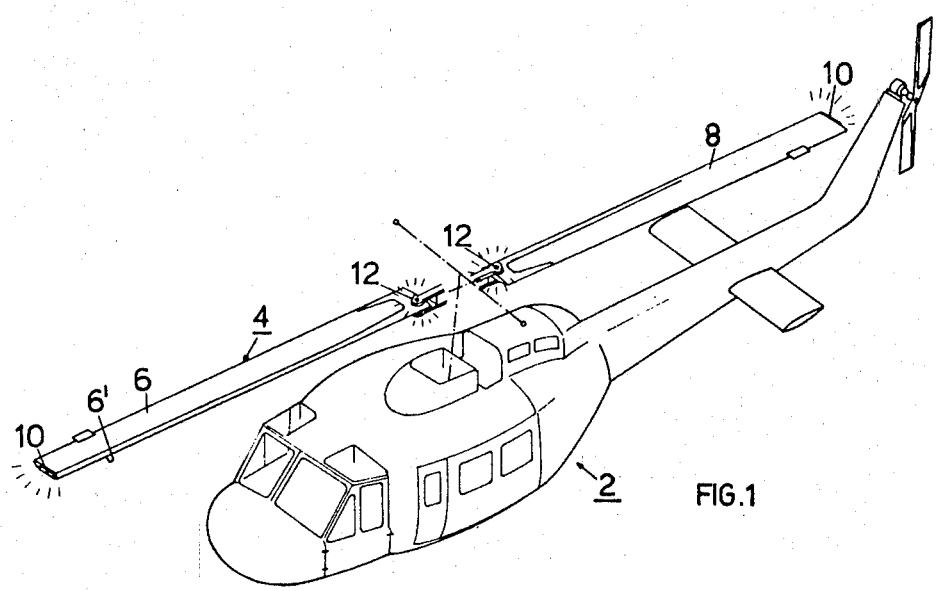
FIG. 1 illustrates a helicopter having a lighting system in accordance with the present invention.
Figure 7:
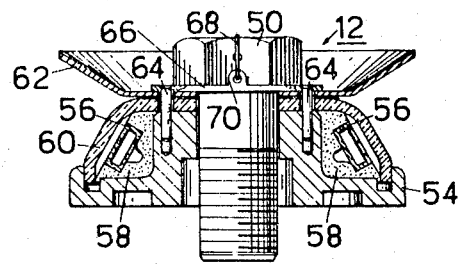
Figure 6:
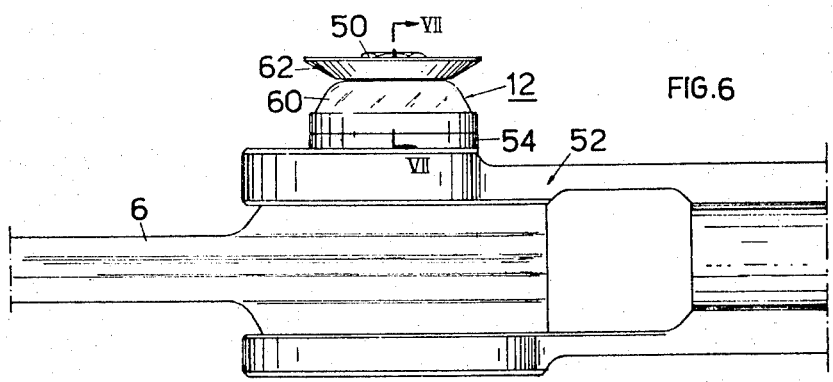
FIG. 6 is a side elevational view of the blade root assembly and the light unit thereon used in the system of FIG. 1, FIG. 7 being a sectional view thereof along lines VII—VII, and FIG. 8 being a top plan view thereof.
Figure 8:
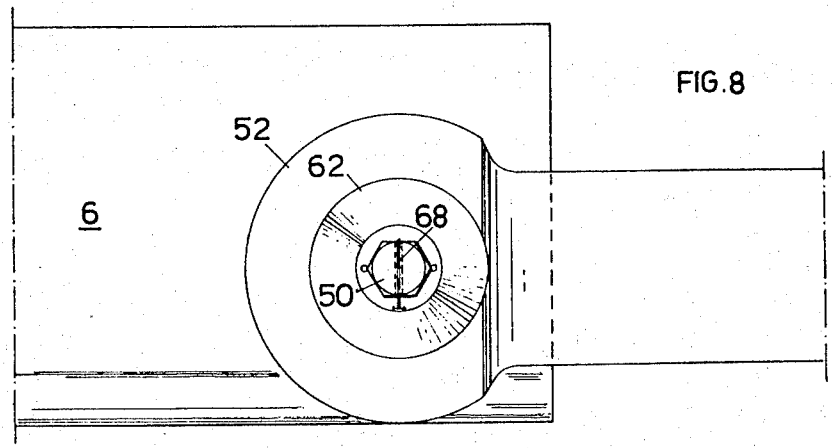

With reference to FIG. 1, there is shown a helicopter 2 having a main rotor 4 including two blades 6 and 8, each equipped with a light unit 10 mounted at the tip of the blade, and a second light unit 12 mounted at the root of the blade. FIGS. 3–5 illustrate the construction and mounting of the blade tip light unit 10; and FIGS. 6–8 illustrate the construction and mounting of the blade root light unit 12.

Blade tip light unit 10 comprises a housing 20, containing six of the nuclear, self-powered light devices 22 described above. These light devices are disposed against or embedded in a layer of cushioning material 24 and are arranged in two horizontal rows of three in each row. A transparent cover 26 is attached to the housing over the light devices. The light unit further includes a metal nose block 28, e.g. of stainless steel, attached to housing 20 in alignment with the leading edge 6' of the rotor blade. Nose block 28 shields the light unit from the severe wear to which the light unit would otherwise be subject during the rotation of the rotor. The bottom wall 21 of housing 20 is extended, as shown at 21', to shield the light from the ground. The upper face of extension 21' may be polished to increase the light reflection from light devices 22.

The light unit 10 is constructed so as to be replaceable with the balancing weights unit normally attached to the rotor tip. The means for attachment and for balancing the rotor are thus greatly simplified, and also the amount of weight added by the use of this unit is minimized.

More particularly, tip light unit 10 includes a pair of parallel studs 30 supporting a plurality of balancing weights 32 secured by nuts 34. An additional stud 36 is mounted at right angles to studs 30, and carries a plurality of further weights 38 secured thereto by nuts 40. In order to add or subtract weights, the nuts 34,40 are removed, and the appropriate weights are added or subtracted. These weights compensate for any unbalance in the rotor (as in the unit now used in existing helicopters), and also for any unbalance caused by the light unit 10.

Light unit 10 is assembled to the tip of the rotor blade in substantially the same manner as the conventional balancing weight unit provided, namely by the use of fasteners, e.g. 42 and 44. It will be seen that when it is mounted, it provides a linear light source substantially coplanar with the rotor blade tip and having its long axis extending transversely of the rotor, with the nose block 28 in alignment with the lending edge of the rotor.

The blade root light unit 12, shown particularly in FIGS. 6-8, is secured to the rotor blade root by the existing bolt 50 which secures the rotor blade to the rotor head assembly 52. This light unit includes a circular housing 54 having a bore along its central vertical axis through which the mounting bolt 50 passes. A plurality of light devices 56 are disposed with the housing in a circular array around the mounting bolt and at an oblique angle with respect to it. Each is of the nuclear self-powered light devices briefly described above, and rests against or is embedded in cushioning material 58 within the housing. A transparent cover plate 60 encloses the light devices 56. Attached to the housing is a dish-shaped reflector 62 having its sides overlying the light devices 56 and reflecting the light in all directions laterally of the unit. Mounting bolt 50 passes through the center of the reflector 62 and transparent cover 60 and secures them to the housing.

In order to firmly anchor light unit 12 against rotation, housing 54 is provided with a pair of centering pins 64, which pass through openings in a washer 66 interposed between the reflector 62 and the head of the bolt 50. Washer 66 is anchored to the bolt by a piece of wire 68 passing through the head of the bolt and a pair of opposed lugs 70 on the washer. The shank of bolt 50 is polygonal, and is therefore non-rotatable. Washer 66, wire 68 and pins 64 anchor the light unit to the bolt against rotation.

Figure 2:
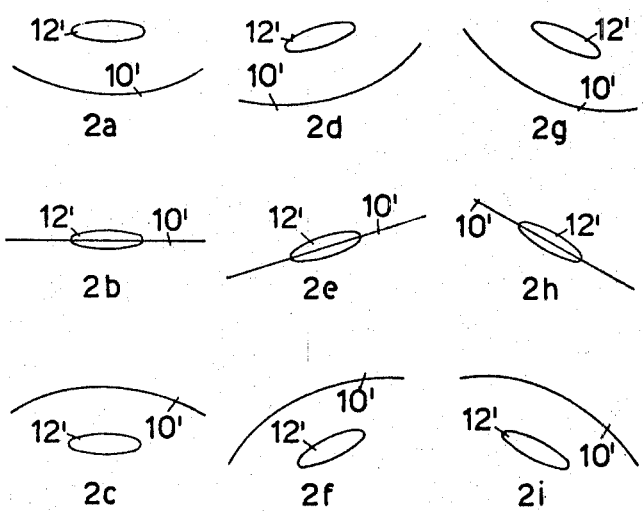
FIG. 2 illustrates a series of light patterns produced by the leader (observed) helicopter under different attitude and headings, as such light patterns would be viewed by the observer.

FIG. 2 illustrates the different light patterns produced by the foregoing lighting system under different operating systems of the leader (or other observed) helicopter as observed by the occupant of another helicopter in the same task force. Light streak 10' produced by the tip light units 10 will in most cases be seen as an arc rather than as a complete circle since each unit is linear and coplanar with the rotor tip, and therefore its view will be blocked by the rotor for part of the rotor rotation. Light units 12, however, emit light in all lateral directions and since they are usually viewed at an angle, their light stream 12' would normally be seen as an ellipse. It serves as a reference for light streak 10'.

FIG. 2a shows the observed light pattern when the leader is below the observer, wherein it will be seen that light stream 10' is in the form of an arc directly below light streak 12'. In FIG. 2b, the leader is at the same attitude as the observer, and therefore light streak 10' is substantially linear and on a line with light streak 12'. In FIG. 2c, the leader is above the observer, and light streak 10' is in the form of an arc overlying light streak 12'.

When making a change in heading, the main helicopter rotor is turned or inclined in the direction of the new heading. Both light streaks 10' and 12' are thereby inclined in the direction of the new heading, and this incline is quickly discernible because of the presence of the reference light streak 12'. This changes in position of the rotor and of the light streaks occurs at the start of the change in heading and thus serves as a prior warning of the actual change in heading.

FIGS. 2d-2f illustrate the light patterns when the leader starts to turn left with respect to the observer. In FIG. 2d, the leader is below the observer; in FIG. 2e he is substantially at the same attitude; and in FIG. 2f he is above.

FIGS. 2g-2i illustrate the light patterns observed when the leader starts to turn right with respect to the observer. In FIG. 2g the leader is below the observer; in FIG. 2h, he is substantially at the same attitude; and in FIG. 2i, he is above.

What is claimed is:

1. A helicopter lighting system to aid in night formation flying, comprising, a first light unit attached to the main helicopter rotor at its tip such as to be viewable to an observer in another helicopter in the formation for only a part of each revolution of the rotor, and a second light unit attached to the main helicopter rotor inboard of its tip such as to be viewable to such observer for the complete revolution of the rotor, whereby the rotation of the helicopter rotor produces a light pattern to such observer, when laterally above or below the helicopter observed, comprising an arc light-streak by said first light unit and an elliptical light-streak by said second light unit, which light pattern provides a quickly discernible indication to such observer of the attitude of the helicopter being observed and of any change in heading thereof relative to the observer.

2. A system according to claim 1, wherein said first light unit includes a linear light source attached to the rotor tip with its long axis extending transversely of and coplanar with the rotor tip.

3. A system according to claim 1, wherein said second light unit is a circular light source attached to the root of the rotor blade and producing light in all directions laterally of the vertical axis of the housing.

4. A system according to claim 1, wherein said first light unit includes balancing weights for balancing the helicopter rotor.

5. A system according to claim 1, wherein said first light unit includes a housing attached to the rotor tip, a linear light source disposed within the housing, and a metal nose block in alignment with the leading edge of the rotor.

6. A system according to claim 1, wherein said second light unit includes a circular housing, a mounting bolt extending through the central vertical axis of said circular housing, a plurality of light devices disposed within said housing in circular array around the mounting bolt and at an oblique angle with respect thereto, and a transparent cover attached to said housing by said mounting bolt and enclosing said light devices.

7. A system according to claim 6, wherein said second light unit further includes a dish-shaped reflector attached at its center to said housing by said mounting bolt with the sides of the reflector overlying the light devices and reflecting the light laterally thereof.

8. A light unit for use in a helicopter lighting system, comprising, a housing attachable to the helicopter rotor blade tip, a linear light source disposed within the housing so that its long axis extends transversely of the helicopter rotor blade when the light unit is attached, a plurality of balanced weights for balancing the helicopter rotor, and a metal nose block carried by the housing to be in alignment with the leading edge of the helicopter rotor.

* * * * *

UNITED STATES PATENT OFFICE
CERTIFICATE OF CORRECTION

Patent No. 3,710,311          Dated January 9, 1973

Inventor(s) RON AVITAL

It is certified that error appears in the above-identified patent and that said Letters Patent are hereby corrected as shown below:

On the cover sheet, insert -- [73] Assignee: Israel Aircraft Industries Ltd., Lod Airport, Israel, a corporation of Israel -- . In the Abstract, line 7, "provide" should read -- produce -- . Column 1, line 37, "velocity" should read -- vicinity -- .

Signed and sealed this 20th day of November 1973.

(SEAL)
Attest:

EDWARD M. FLETCHER, JR.          RENE D. TEGTMEYER
Attesting Officer                Acting Commissioner of Patents